J. L. WOLFE.
TEST INDICATOR.
APPLICATION FILED JULY 24, 1908.

1,134,713.

Patented Apr. 6, 1915.

Witnesses:
A. Newcomb
M. L. Browne

Inventor
Joseph L. Wolfe
By his Attorneys
Prindle & Wright

UNITED STATES PATENT OFFICE.

JOSEPH L. WOLFE, OF BRIDGEPORT, CONNECTICUT.

TEST-INDICATOR.

1,134,713.      Specification of Letters Patent.      Patented Apr. 6, 1915.

Application filed July 24, 1908. Serial No. 445,239.

*To all whom it may concern:*

Be it known that I, JOSEPH L. WOLFE, of Bridgeport, in the county of Fairfield and in the State of Connecticut, have invented a certain new and useful Improvement in Test-Indicators; and I do hereby declare that the following is a full, clear, and exact description thereof.

My invention relates to a test indicator, and especially to one which is adapted to be readily moved into and supported in any position which is found desirable, for measuring the movements of, or inaccuracies in the construction of, any particular piece of work being constructed.

The test indicator which constitutes an embodiment of my invention is furthermore so constructed that the same can be used for measuring the movements of work of almost any character with very little change or adjustment. That is to say, my test indicator is adapted to measure the movements of plane or curved surfaces. It is also adapted to be used in connection with the measurement of movements of the work, where the point of contact of the test indicator with the work constitutes an opening of some considerable size. In this instance, it will be seen that means must be provided in the construction of the test indicator to prevent the portion of the test indicator coöperating with the said opening from having too great a freedom of movement. I provide my test indicator with such a means.

Figure 1:
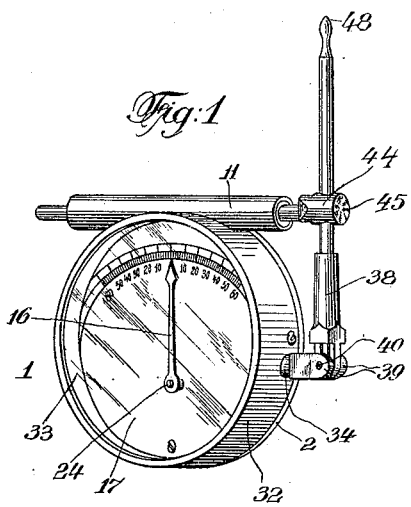
Figure 2:
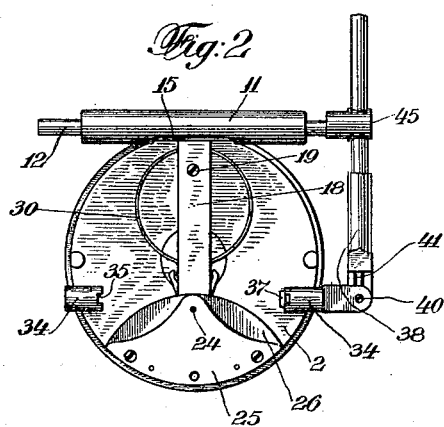
Figure 3:
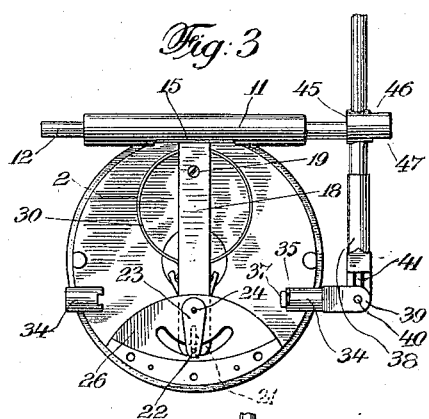
Figure 4:
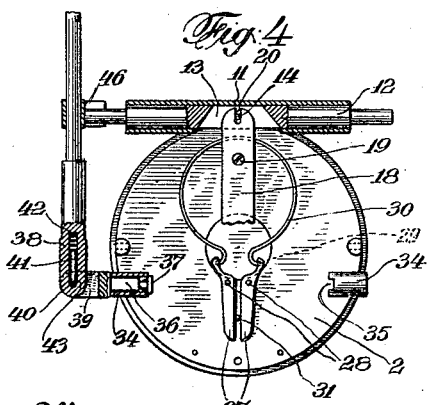
Figure 5:
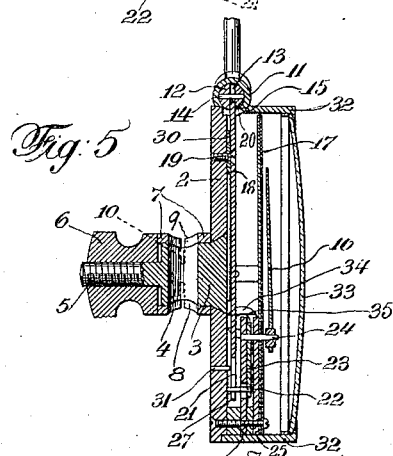

Figure 1 is an elevation in perspective of my test indicator; Fig. 2 is a front elevation of the same with certain parts removed, Fig. 3 is a similar view with more parts removed; Fig. 4 is another similar view with still other parts removed; and Fig. 5 is a vertical transverse section of the entire test indicator.

In the drawings 1 is a test indicator having a base plate 2, to the center of which is affixed a swivel post 3 having a transverse opening 4 for the insertion of a rod located in proximity to the work to be tested. The said swivel post 3 has also on its end a screw-thread 5, with which a thumb screw 6 is adapted to coöperate. On the outer side of the swivel post and beneath the lower surface of the thumb-screw 6, I have located a sleeve 7, which is provided with openings 8, 9 passing diametrically through the same and adapted to aline with the opening 4. The sleeve 7 is also provided with a slot 10 which passes almost completely around the same, intersecting the openings 8, 9. The object of this arrangement is that, when once the test indicator has been placed upon a rod by means of the insertion of the latter into the opening 4, the test indicator can be adjusted and secured in any desired position by the tightening of the thumb-screw 6, which simultaneously secures the sleeve 7 and the swivel post 3 in their adjusted positions.

At one side of the plate 2, I locate a tube 11, which is adapted to contain a plunger 12, the ends of which extend beyond either end of the tube 11. The plunger 12 is milled for a certain distance at its center and provided, in the recess 13 resulting therefrom, with a pin 14. The tube 11 is cut away at the point 15 so as to provide access to the recess 13 of the plunger 12. Means is provided on the inner face of the plate 2 for conveying the movements of the plunger 12 to a pointer 16 situated upon a dial 17. This consists of a lever 18 pivoted at 19 to the plate 2 and having one end provided with a slot 20, designed to receive the pin 14 carried by the plunger 12. The other end of the lever 18 is slotted in a similar manner at 21. The latter slot 21 is designed to receive a pin 22, which is carried upon an arm 23 connected to the post 24 which supports the pointer 16. It will thus be seen that any movements of the plunger 12 are communicated to the post 24 so as to move the pointer 16 situated above the dial 17. The arm 23 and the attached post 24 are supported in any convenient manner above the surface of the plate 2 and above the lever 18. I find it preferable, however, to support the same between two segmental plates 25 and 26, which extend from the side of the plate 2 opposite to that at which the tube 11 is situated.

I also provide my device with means for automatically returning the pointer 16 to its central position when the same is not deflected away from the middle position by the movements of the work being tested. In order to accomplish this result, I extend the pin 22 downwardly beneath the surface of the lever 18, where it is designed to coöperate with the lower ends of the levers 27 symmetrically situated with regard to each other and pivoted at the points 28. At the upper ends of these levers, I provide the recesses 29 for receiving the ends of the C-spring 30. A stop 31 is also provided in the face of the plate 2 and between the two levers 27 so as to maintain the levers, and as a consequence, the pointer 16 coöperating therewith, at their central positions. I provide the apparatus so constructed with a casing 32 and a watch crystal 33, so as to cover the moving parts and the dial in the usual manner. The test indicator constructed in this manner is designed to be used by bringing the ends of the plunger 12, which extend beyond the ends of the tube 11, into contact with a moving surface so as to measure the variations in the position of the same. I also adapt my device, however, for use in connection with the measurement of work of other varieties in the following manner:—At either side of the plate 2, I locate a short, horizontal tube 34, the inner surface of which is cylindrical, but the inner end of which is provided with oppositely disposed rectangular recesses 35. The purpose of this construction is to receive the cylindrical extension 36 having a squared T-shaped end 37, which is attached to an auxiliary arm 38. This construction is such that when once the cylindrical extension 36 with its attached squared end 37 is inserted into the tube 34 until the squared end has passed entirely through the squared portion 35 of the tube, and the cylindrical extension then rotated for 90°, the cylindrical extension and the attached auxiliary arm 38 are maintained in position in the tube 34, the T-shaped end 37 registering with the recesses 35. Nor can the cylindrical extension be again withdrawn from the tube 34 until the former has been rotated 90°. The cylindrical extension 36 is secured to the auxiliary arm 38 in the following manner:—Attached to the extension 36, there is a slotted end 39 carrying a pivot pin 40, which is connected to a plunger 41 extending into the body of the auxiliary arm 38. In the interior of the auxiliary arm 38 and beyond the end of the plunger 41, there is a spring 42 which is designed to extend the plunger 41 outwardly until the pivot pin 40 is brought into contact with the end of a slot 43 in which the plunger 41 is situated. At the center of the auxiliary arm there is a contact member 44, one face of which is a plane surface 45 and on the opposite face of which is a similar plane surface 46 but provided on either side thereof with the guides 47. The auxiliary arm 38 is preferably, but not necessarily, attached to the contact member by being passed directly through the body thereof, so as to construct the same with sufficient strength to withstand injury. The end of the auxiliary arm 38 is reduced to a point 48.

The operation of the test indicator is as follows:—The test indicator is positioned upon a rod passing through the opening 4, in the manner already described, and the same secured fixedly in its adjusted position, by tightening the thumb-screw 5. Should it be desired now to register the movements of a piece of work having a smooth surface, one end of the plunger 12 will be brought into contact with said surface in such a manner that when the end of the plunger rests upon that portion of the work having the correct and approved position, the pointer of the test indicator will point to zero. Upon any change in the position of the work, after this adjustment has taken place, the pointer will be moved away from the zero point of the scale and indicate the extent of such movement. The movement of the pointer through the agency of the movements of the plunger is effected as described above, by means of the lever 18, one slotted end of which is connected with the plunger and the other slotted end of which coöperates with the pin 22, which is adapted to convey motion to the post 24 by means of the arm 23. It should be noted that I have located the C-spring 30 in such a manner that upon the movement of the levers 27, it is compressed instead of extended, and as a consequence, the spring is adapted at all times and for an indefinite period of time, to be equally effective.

When it is desired to use the test indicator in connection with a prick punch point located in the work, the auxiliary arm 38 is attached to the most convenient side of the test indicator by inserting the cylindrical extension 36 into the tube 34 located on that side. The auxiliary arm is then moved in such a way as to bring the plane surface 45 of the contact member 44, located on the arm, into contact with one end of the plunger 12. In this position, the work is permitted to have a variety of movements without in any way interfering with the efficiency and adjustment of the test indicator. This follows from the fact that the plane surface 45 is free to slide over the end of the plunger 12, the point of the auxiliary arm 38 being meanwhile maintained in the prick punch mark on the work. The auxiliary arm is also capable of a longitudinal movement because of the spring-pressed plunger connection which it has with the cylindrical extension 36. Should it be desired to measure the movements of the work by maintaining the outer end of the auxiliary arm 38 in a slot or hole larger than the diameter of the auxiliary arm, the latter is then turned around in such a manner that the other plane surface 46 with its guides 47, is brought into contact with the end of the plunger 12. In this position, while the end of the auxiliary arm 38 is maintained in the opening in the work above referred to, the said auxiliary arm is prevented from being displaced in the large opening in which it operates, because of the presence of the guides 47. At the same time, while a rotary movement of the arm upon the cylindrical extension as a center is not permitted in this position of the arm, the latter is permitted to have a longitudinal movement because of the presence of the spring-pressed plunger in the body of the arm.

It will thus be seen that my device is constructed in such a manner that it can be supported in almost any position which might be found desirable for the measurement of the movements of the work. It is also so constructed that it is applicable to the measurement of the movements of work of various types. In fact, its applicability in this regard is practically universal. The interior construction of the test indicator is furthermore of such a character as to conduce in a maximum degree to the simplicity of the parts, the accuracy of the measurements, and the freedom from necessary adjustments to as great a degree as possible.

While I have thus described my invention in detail, I nevertheless consider that my invention is of a broad nature, and that the same is capable of many changes and modifications without departing from the spirit thereof.

I claim:—

1. In an indicator, the combination of a movable pointer, means to respond to the movements of the edges and other portions of plane or curved surfaces comprising the two free ends of a movable plunger, and means for transferring the motion of the plunger forwardly and rearwardly from its normal position to the pointer.

2. In an indicator, the combination of a movable pointer, means to respond to the movements of the edges and other portions of plane or curved surfaces, comprising the two free ends of a spring-pressed plunger, and means for transferring the motion of the plunger forwardly and rearwardly from its normal position to the pointer.

3. In an indicator, the combination of a movable pointer, a plunger having both ends free, said ends being adapted to respond to the movements of the work, means for transferring the motion of the plunger to the pointer, and means including a C-spring, for maintaining said pointer in its middle position.

4. In a device of the character described, the combination of means for indicating the movements of plane surfaces and an auxiliary arm attachable to the indicating means, and having a point for coöperating with a prick-punch point to indicate the movements of the work, said arm being slidably supported for movement in a longitudinal direction.

5. In a device of the character described, an indicating means, and an auxiliary arm for coöperating with said means to indicate the movements of the work, said arm having a jointed connection for securing it to the indicating means, and having a locking device for locking it to the indicating means.

6. In a device of the character described, an indicating means, and an auxiliary arm for coöperating with said means to indicate the movements of the work, said arm having a movable connection for securing it to the indicating means, comprising a flattened end adapted to be connected with and disconnected from the indicating means by the rotation of the auxiliary arm.

In testimony that I claim the foregoing I have hereunto set my hand.

JOSEPH L. WOLFE.

Witnesses:
OTTO H. STEGEMANN,
WILLIAM A. THOMPSON.

Copies of this patent may be obtained for five cents each, by addressing the "Commissioner of Patents, Washington, D. C."